March 2, 1954  J. J. CURRY  2,670,878
PROPORTIONING DEVICE
Filed May 29, 1950  2 Sheets-Sheet 1

INVENTOR.
JOHN J. CURRY
BY Caesar and Rivise
ATTORNEYS

March 2, 1954  J. J. CURRY  2,670,878
PROPORTIONING DEVICE
Filed May 29, 1950  2 Sheets-Sheet 2

*INVENTOR.*
JOHN J. CURRY
BY
Caesar and Rivise
ATTORNEYS

Patented Mar. 2, 1954

2,670,878

UNITED STATES PATENT OFFICE 2,670,878

PROPORTIONING DEVICE

John J. Curry, Philadelphia, Pa.

Application May 29, 1950, Serial No. 165,012

5 Claims. (Cl. 222—137)

The present invention relates to proportioning devices, and has particular reference to the devices of the type for proportioning ingredients which are to be intimately admixed for dental or medical use.

The device of the invention lends itself particularly for use by dentists in the preparation of dental amalgams, and for that reason will be described with specific reference to such application. The device is susceptible of many other uses, for instance, in the filling of medical prescriptions requiring the accurate proportioning of ingredients.

It is the primary object of the invention to provide a proportioning device particularly adapted for medical and dental use, which is of very simple, inexpensive, compact and rugged construction, and which is capable of accurately proportioning materials in a minimum amount of time and with minimum effort.

Another important object is to provide a highly effective device for automatically measuring and proportioning two materials, which are to be intimately admixed for medical or dental use.

Another object of importance is to provide a device adapted to automatically and completely dispense two materials in predetermined measured and proportioned quantities suitable for subsequent intimate mixing for medical or dental use.

Briefly stated, the proportioning device consists of a base provided with two spaced apertures, two connected slides mounted for movement in said base, each slide being provided with two apertures, two containers mounted on said base, each container being provided with two apertures in its bottom, said slides being adapted to be moved in unison to bring either one of the apertures of each slide in registration with one aperture in the bottom of one of said containers and the other aperture in each slide in registration with one of the apertures in said base.

In its preferred aspect, the proportioning device is provided with means for subjecting it to a mild vibration to cause complete filling and emptying of the apertures. In said aspect, the invention consists broadly in the combination of a proportioning device and means to subject said device to a mild vibration.

The accompanying drawings show the presently preferred embodiment of the invention for the purpose of illustrating the invention. Referring to said drawings.

Figure 1:
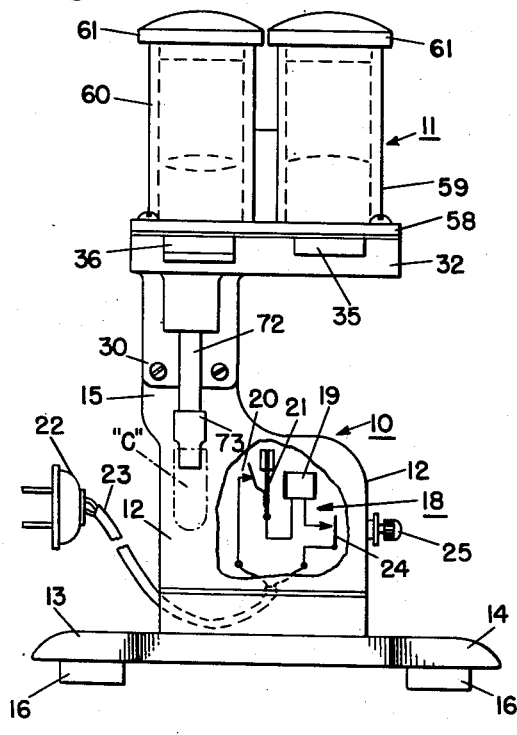
Figure 1 is a front elevational view of the preferred embodiment.
Figure 2:
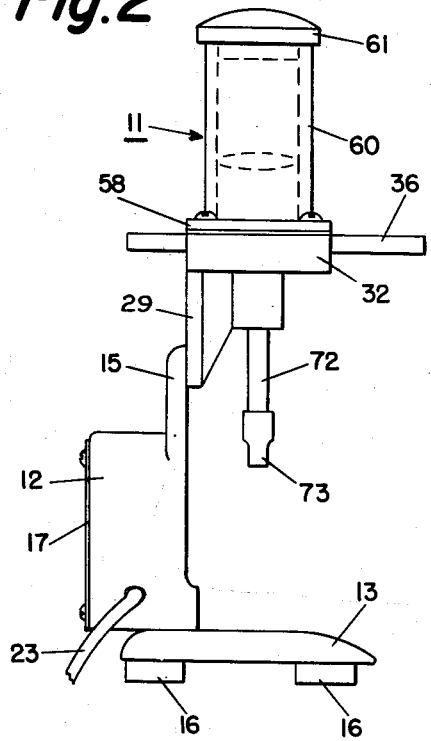
Figure 2 is a side elevation.
Figure 3:
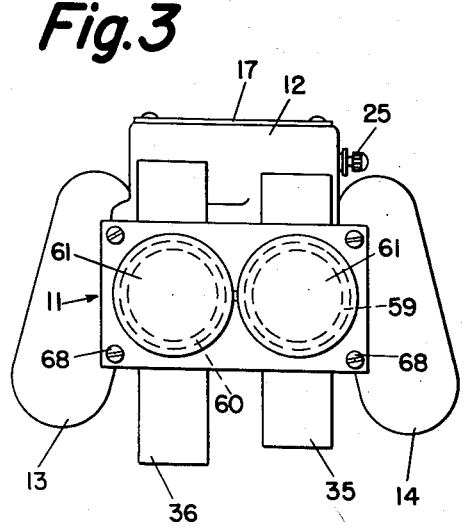
Figure 3 is a plan view.

Referring to the drawings in greater detail, it will be noted that the reference numeral 10 denotes a supporting stand generally, and that 11 refers generally to the elements for storing and proportioning the materials. The stand 10 consists of a housing 12, supported on two feet 13 and 14, and an upwardly projecting arm 15. The feet 13 and 14 are provided with soft rubber pads 16, which permit the device to vibrate freely. The numeral 17 designates a cover plate to permit access to the interior of the housing, wherein is disposed an electric vibrator 18.

The vibrator may be of any suitable simple construction. It is schematically illustrated as consisting of an electromagnet 19, connected in series with a contactor switch 20, associated with a vibratory member 21. Electric current is supplied through a standard outlet plug 22 and cord 23. The circuit contains an off-on switch 24, which is controlled by a hand knob 25 on the housing 12.

The storage and proportioning unit 11 is mounted on the upright arm 15 of the supporting stand 10, and advantageously overhangs the front wall of the housing 12. The unit 11 may be provided with a dependent arm 29, which may be secured to the arm 15 by means of screws 30. This makes for greater ease in manufacturing the device, and facilitates the replacement of defective or broken parts.

The reference numeral 32 denotes the body portion of the proportioning element, which is preferably of a suitable molded plastic material. The reference numerals 33 and 34 designate two parallel slots extending from the front to the rear and adapted to receive the proportioning slides 35 and 36 respectively. These slides are secured together by means of a tie rod 37. A communicating slot 38 is provided between the slots 33 and 34 so as to receive the tie rod 37 and to give it considerable freedom of movement. The slot 38 is formed with off-set surfaces 39 and 40 to provide stops for limiting the movement of the tie rod 37. A cavity 41, having an inclined bottom 42, forms a funnel beneath the two proportioning plungers 35 and 36 and the tie rod 37. A vertical aperture 42' is provided at the lowest point in the bottom 42.

The floors of the two slots 33 and 34 are provided with a plurality of blind holes 43 for receiving compression springs 44. Received within the slot 33 is a pressure pad 45 of a suitable plastic material, unaffected by the action of mercury. This pad is provided with a central aperture 46 which communicates with the cavity 41. The recess 33 may be provided with retaining lips 47 and 48 to prevent movement of the pressure pad 45 when the slide 35 is moved.

Received within the slot 34 is a pressure pad 49 formed of metal particularly adapted to resist the abrasive action of powdered metal. This element has downwardly extending flanges 50, 51, which fit over the sides of body member 32, and serve to prevent relative movement thereof when the slide 36 is moved. The pad 49 is provided with an aperture 52, which communicates with the cavity 41.

The slide 35 has two removable insert bushings 53 and 54 having very carefully drilled inside diameters to provide space for a predetermined volume of material such as mercury. The slide 36 is made of plastic material with laminations of metal 36' to resist the abrasive action of powdered metal. It is similarly provided with insert bushings 55 and 56, having inside diameters to provide space for a predetermined volume of material, such as powdered metal mixtures or alloys especially prepared for dental use. By using insert bushings 53, 54 and 55, 56 having predetermined diameters, it is possible to obtain a predetermined accurate proportioning of ingredients by volume. Spare sets of bushings may be provided for use, when it is desired to change the relative proportions.

Figure 4:
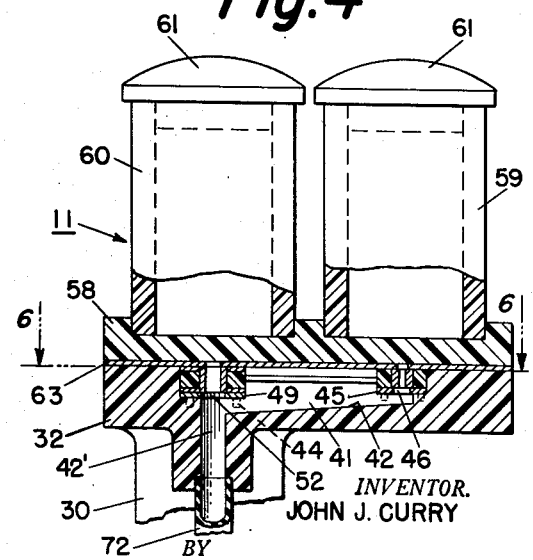
Figure 4 is an enlarged view, partly in elevation and partly in cross-section, of the proportioning elements.
Figure 5:
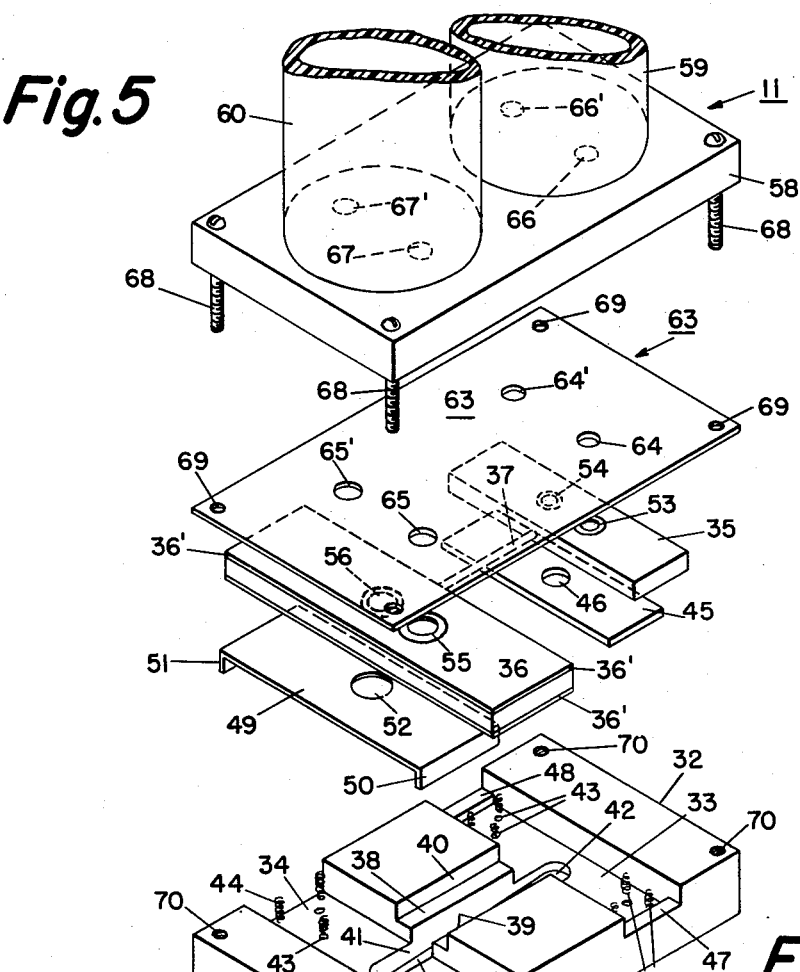
Figure 5 is an exploded perspective view of the elements shown in Figure 4.

As previously stated, the reference numeral 11 refers generally to the elements for storing and proportioning the materials. These elements may be made of a single molded piece or may be constructed as shown in Figure 4 of a base 58 and two cylindrical tubes 59 and 60. Suitable stoppers 61 may be provided to exclude dirt and to prevent loss of material by splashing. Interposed between the base 58 and the proportioning slides 35 and 36 is a friction plate 63. This plate is provided with the two sets of apertures 64, 64' and 65, 65'. Set 64, 64' is in registration with a similar set of holes 66, 66' in the base 58, and set 65, 65' is in registration with a similar set 67, 67'. The holes 66, 66' communicate with the tube 59, and the holes 67, 67' are in communication with the tube 60.

The proportioner is assembled as shown in Figure 4, the parts being held together by four screws 68 passing through base 58, through holes 69 in the friction plate 63 into tapped holes 70 in the body 32. It is to be noted that the distance between the two bushings 53 and 54 (55 and 56) is one half the distance between holes 64 and 64' (65 and 65'), that when the bushings 53, 55 are in registration with holes 64, 65 the bushings 54, 56 are in registration with the apertures 46, 52 in the pressure pads 45, 49, and that when the bushings 54, 56 are in registration with the apertures 64', 65', the bushings 53, 55 are in registration with holes 46, 52 in the pressure pads. This registration is brought about by the off-set surfaces 39 and 40.

Figure 6:
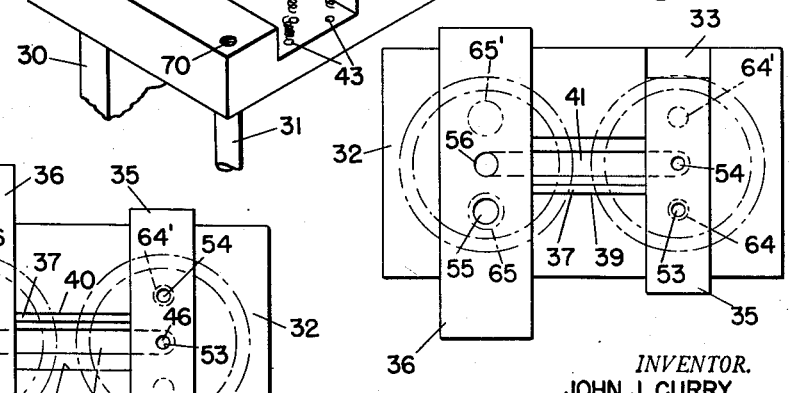
Figure 6 is a view taken on line 6—6 of Figure 4, showing one extreme position of the slides.
Figure 7:
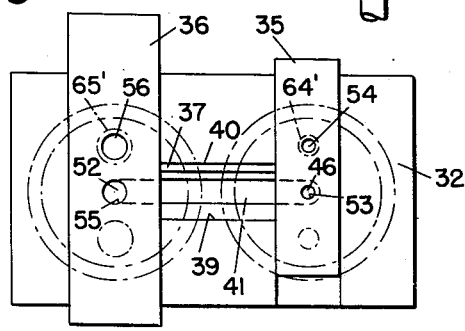
Figure 7 is a similar view, showing the slides in the opposite position.

Figures 6 and 7 illustrate how the materials in the two tubes 59 and 60 are proportioned and then dispensed or fed from the proportioning device. Referring to Figure 6, it will be seen that when the slide 36 is pushed to the position shown, bushing 55 is brought into registration with the hole 65, communicating with the container tube 60. Similarly, because of the tie bar 37, bushing 53 of slide 35 is brought into registration with the aperture 64, communicating with the other container tube 59. The off-set surface 39 stops tie bar 37 in proper aligning position. Thus the respective bushings are filled with proportional amounts of material from the containers by gravity plus a vibrating action to be described hereinafter. Now by changing position of slide 36 to that shown in Figure 7, where tie bar 37 rests against off-set surface 40, bushing 55 with its contents is brought into alignment with communicating hole 52 of pressure pad 49, and the contents of bushing 55 are deposited into the funnel-like cavity 41. Similarly, slide 35 is moved because of its connection with plunger 36, bringing bushing 53 and its contents into registration with communicating hole 46 of the pressure pad 45, and causing the contents to drop into cavity 41. Thus are deposited two carefully predetermined volumes of material in a desired proportion into cavity 41. The material from the tube 59 drops directly through aperture 42' at the bottom of the inclined plane 42. The material from the tube 60 proceeds across inclined bottom 42 by gravity and moderate vibration described hereinafter, and falls through the aperture 42'. Meanwhile, bushings 54 and 56 have automatically been brought into registration with other communicating holes 64' and 65', where they are charged with materials ready for deposit when the cycle is completed and slides are returned to position shown in Figure 6.

The proportioned materials may be received in a capsule and transferred to a suitable form of mixing device. In the preferred embodiment, a flexible tube 72 is secured to the proportioning device in alinement with the aperture 42'. Said tube, which may be of transparent plastic or glass, may have a plastic nipple 73 secured to its lower end. A capsule C may be temporarily secured to the nipple to receive a proportioned mixture of materials from the proportioning device.

It will be understood that the above described proportioning is performed while the vibrator is operating. The proportioning device is thus subjected to a mild vibration, which causes complete filling and emptying of the respective bushings according to the relative positions which they happen to occupy.

This application is a continuation in part of Application Serial No. 712,035 filed November 23, 1946 now Patent No. 2,541,043 dated February 13, 1951.

I claim:

1. As a subcombination of a proportioning device, a base having an aperture therein, a container mounted on said base and having two apertures in its bottom, said container having a single compartment a slide positioned between said container and said base, and being provided with two apertures therein, the distance between the apertures in said slide being one half the distance between the apertures in the bottom of said container, either one of the apertures in said slide being adapted to be brought into registration with one of the apertures in the bottom of said container, the other aperture being thereby brought into registration with the aperture in said base, and means to subject said base to a mild vibration to cause complete filling and emptying of the apertures in said base.

2. A proportioning device comprising, a base having two spaced apertures and two offset surfaces, first and second containers mounted on said base each having first and second apertures, first and second slides mounted for movement in said base each provided with first and second apertures, the distance between the apertures in each slide being less than the distance between the apertures in the bottoms of each of said containers, and a rod member connecting said first and second slides and alternately engaging the offset surfaces of said base determining first and second terminal positions of said slides, said slides in their first terminal position having their first apertures respectively registering with the first apertures of said containers, and their second apertures respectively registering with a respective one of said apertures of said base, said slides in their second terminal position having their second apertures respectively registering with the second apertures of said containers, and their first apertures respectively registering with a respective one of said apertures of said base.

3. In a proportioning device, a base having an aperture therein, a container mounted on said base and having two apertures in its bottom, said container having a single compartment, a slide mounted for movement in said base beneath said container and being provided with two apertures spaced apart at a distance less than the distance between the apertures in the bottom of the container, and stop means associated with said base and slide determining two terminal positions of said slide whereby in each terminal position one of said slide apertures registers with only one of said container apertures and the other slide aperture registers with said base aperture.

4. A proportioning device comprising a base having two spaced apertures, first and second containers mounted on said base each having first and second apertures, first and second interconnected slides mounted for unitary movement in said base each provided with first and second apertures, the distance between the apertures in each slide being less than the distance between the apertures in each container, and stop means associated with said base and slides determining two terminal positions of said slides, whereby in one terminal position the first slide apertures register with the first container apertures while the second slide apertures register with the base apertures and in the other terminal position the second slide apertures register with the second container apertures while the first slide apertures register with the base apertures.

5. A proportioning device comprising a base having an elongated trough in communication with a discharge spout, spaced plates mounted thereon each having an aperture opening into said trough, two containers mounted on said plates each having a pair of apertures in its bottom, a slide between said containers and said plates having spaced pairs of apertures, the distance between the apertures in each pair of slide apertures being less than the distance between the apertures in the bottom of each container, and stop means associated with said base and slide determining two terminal positions of said slide, whereby in each terminal position only one of each pair of slide apertures registers with only one of each container aperture while the other slide apertures register with the apertures in said plates.

JOHN J. CURRY.

References Cited in the file of this patent

UNITED STATES PATENTS

| Number | Name | Date |
|---|---|---|
| 20,301 | Robinson | May 18, 1858 |
| 20,946 | Kirk | July 20, 1858 |
| 28,896 | Owen | June 26, 1860 |
| 398,119 | Baughn | Feb. 19, 1889 |
| 780,680 | Paterson et al. | Jan. 24, 1905 |
| 1,031,299 | Thomas | July 2, 1912 |
| 1,286,881 | Gray | Dec. 3, 1918 |
| 1,343,924 | McCorkle | June 22, 1920 |
| 1,605,832 | Garhart | Nov. 2, 1926 |
| 1,746,766 | Grandall | Feb. 11, 1930 |
| 1,956,460 | Brown | July 24, 1934 |
| 2,405,507 | Lefren | Aug. 6, 1946 |
| 2,510,317 | Perkins | June 6, 1950 |